No. 659,263. Patented Oct. 9, 1900.
C. M. W. SMITH.
RELIEF VALVE.
(Application filed Jan. 30, 1900.)

(No Model.) 2 Sheets—Sheet 1.

WITNESSES: INVENTOR
Charles M. W. Smith.
BY
ATTORNEY.

UNITED STATES PATENT OFFICE.

CHARLES M. W. SMITH, OF CAMBRIDGE, MASSACHUSETTS, ASSIGNOR TO WALTER C. CARR, OF NEW YORK, N. Y.

RELIEF-VALVE.

SPECIFICATION forming part of Letters Patent No. 659,263, dated October 9, 1900.

Application filed January 30, 1900. Serial No. 3,293. (No model.)

*To all whom it may concern:*

Be it known that I, CHARLES M. W. SMITH, a citizen of the United States of America, and a resident of the city of Cambridge, in the county of Middlesex and State of Massachusetts, have invented new and useful Improvements in Automatically - Operated Relief-Valves, of which the following is a specification.

This invention relates to an improvement in the form and construction of an automatically-operated relief-valve for steam, air, or other gases under pressure, and has for its object the minimizing of the vertical movement of the valve proper in order to obtain sufficient passage area to readily and quickly provide for the equalization of pressure, steadying the movement of such valve, so that it is not liable to violent fluctuations or fluttering, providing easily-adjustable means of quickly and readily varying the pressures at which the valve will operate, and a form of construction which will admit of the mechanism being confined within a small space, means for keeping the different parts of the mechanism in alinement, and means for reducing the friction on the working parts and providing features which will allow of a minimum amount of friction if the operative parts wear out of line.

The invention consists of certain parts and details and a combination of the same, which will be fully described hereinafter, and reference is to be had to the accompanying drawings, forming a part of this specification, in which similar characters represent the corresponding parts in both views.

Figure 1:
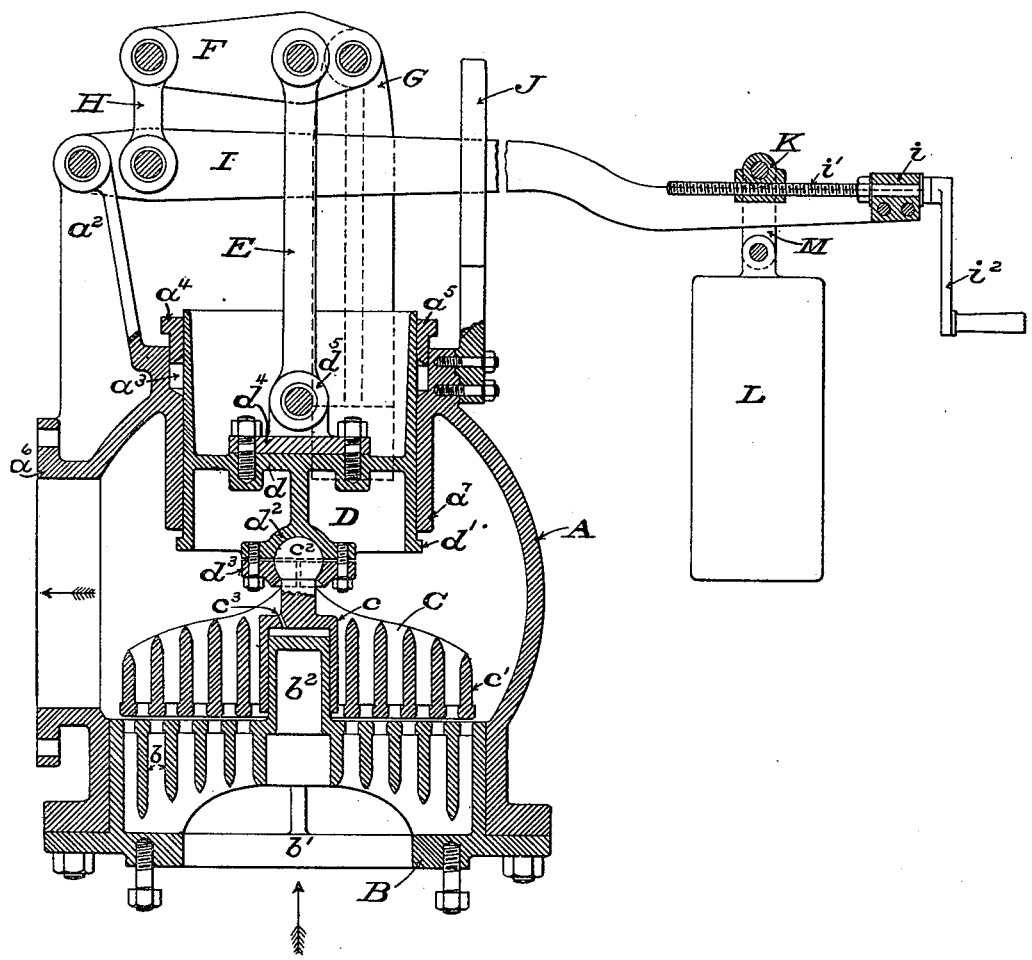
Figure 2:
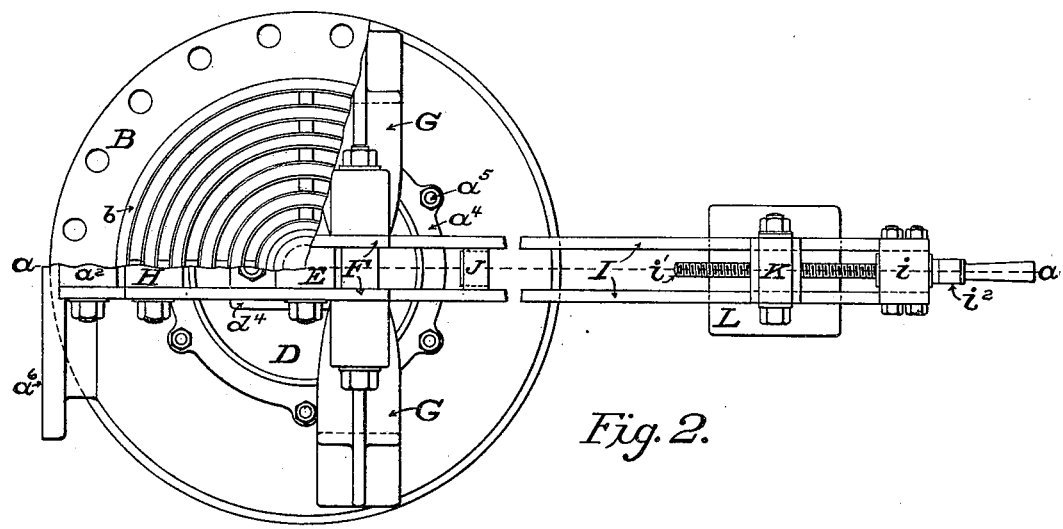

Figure 1 is a vertical cross-section on the line $a$ $a$ in Fig. 2. Fig. 2 is a plan view with the upper left-hand corner, showing the case of the valve, broken away, so as to exhibit the annular concentric rings forming the valve-seat.

A is the main valve-casing.

B is a removable seat consisting of annular concentric rings $b$, the upper edges thereof being oppositely beveled and situated in the same plane, the lower part of this removable seat forming a flange $b'$ for the purpose of attaching to a supply-pipe. This seat also is provided with a vertical cylindrical projection $b^2$, projecting from the central upper part thereof above the plane in which the upper ends of the annular eccentric rings $b$ are situated, so as to form a guide for the valve proper, C, and at the same time act as a plunger entering into the dash-pot $c$, which forms part of the valve proper, C, and which is provided with a relief-opening $c^3$.

The valve proper, C, consists of a series of annular concentric rings $c'$, arranged so that their diameters will be alternate with the diameters of the corresponding annular rings $b$ in the removable valve-seat B, the lower edges of these annular rings $c'$ being in the same plane and having their lower edges oppositely beveled at the same incline as the upper edges of the alternate rings $b$ in the removable valve-seat B, the dash-pot $c$ also forming a guide in connection with the plunger $b^2$, so as to bring the bevel-faces of the annular rings of the valve C and seat B fairly and squarely into contact with each other and make a series of air, gas, or vapor tight joints.

The central upper portion of the valve C is formed into a ball $c^2$, so as to form part of a ball-and-socket joint connecting the valve C to the piston-like guide or plunger D. This piston-plunger D consists of a hollow cylindrical casting with a diaphragm $d$ extending diametrically across it below the vertical center thereof and is provided with an annular projecting flange $d'$ on its lower part, which acts as a stop to limit the vertical movement thereof by coming in contact with an annular downwardly-projecting flange $a^7$, which is integral with the valve-case A. It is also provided with a central downwardly-projecting cup $d^2$ and cap $d^3$, removably fastened thereto, so as to form the socket of a ball-and-socket joint in connection with the ball $c^2$ on the upper central portion of the valve C.

Removably connected to the diaphragm $d$ of the piston D is a boss $d^4$, having on its upper end lugs $d^5$ for the purpose of connecting therewith the vertical lever E. This lever is in turn connected to the two-part lever F, the short ends of which are fulcrumed on the upper end of the arms G, which are supported on the main valve-case A, and the longer ends connected by the link H to the two-part lever I, which are in turn fulcrumed on the vertical projecting arms $a^2$ integral with the case A. The longer end of this two-part lever I is prevented from horizontal vibration by means of the guide J, bolted to the case A. The extreme outer end of the two-part lever I is provided with a bearing $i$, carrying the adjusting-screws $i'$. This screw has a bearing in the sliding nut K, carried on the top of the two-part lever I. The nut K is flexibly connected to the weight L by the downwardly-depending link M. The upper part of the annular projecting flange $a^7$ of the main valve-case A is enlarged and bored out, so as to form a stuffing-box $a^3$, and is provided with a packing-gland $a^4$, which is adjusted into the stuffing-box $a^3$ by means of the packing-studs $a^5$. The case A is also provided with a horizontal flange-opening $a^6$ for the purpose of attaching it to a delivery-pipe. The direction of the gases under pressure through the valve is shown by the arrows. All of the bearings between the levers, links, and fulcrums are provided with antifriction-roller bearings.

The operation of the valve is as follows: Should the pressure in the supply-pipe leading to the under side of this valve fall below a predetermined point for which the weight L and its connecting levers are adjusted, the valve C would slowly descend and seat itself upon the valve-seat B, thereby preventing any backflow or return flow of the pressure. Again, should an excessive pressure be obtained in the supply-pipe leading to the under side of the valve the valve would slowly adjust itself to the new conditions, and thus prevent undue shocks to the mechanism to be operated by gases under pressure. Also, should liquids be introduced into the supply-pipe, which under gravity might flow through an unobstructed pipe, this valve would prevent the passage of such liquids unless under a pressure exceeding that at which the valve was adjusted.

Having fully described my invention, what I desire to secure and claim by Letters Patent is as follows:

1. In a pressure-relief valve, the combination of a valve-body or casing, a weighted lever hinged to said casing, a valve consisting of a series of annular concentric rings flexibly connected thereto, provided with a centrally-located dash-pot integral therewith, and an annular concentrically-ringed valve-seat provided with a vertically-projecting piston operating in said dash-pot, substantially as described.

2. In a pressure-relief valve, the combination of a valve body or casing, a weighted lever hinged to said casing, a guiding-plunger operatively connected thereto, an annular concentrically-ringed valve consisting of a series of annular rings flexibly connected to said plunger, so as to be free to adjust itself to its seat in all directions, and an annular concentrically-ringed valve-seat consisting of a series of annular rings removably attached to said valve body or casing, substantially as described.

3. In a pressure-relief valve, the combination of the main valve body or casing A, seat B removably connected thereto, provided with vertically-projecting piston $b^2$ integral therewith, main valve C provided with dash-pot $c$ integral therewith, flexibly connected to plunger D which in turn is hinged by link E to the two-part lever F, which in turn is hinged by link H to two-part lever I, which in turn is hinged to the main valve case or body A by means of vertically-projecting lugs $a^2$, this two-part lever I being steadied by guide J, which is fastened to the main case A and is provided with the sliding nut K, from which the weight L is suspended by means of the links M, which weight is horizontally adjustable on the two-part lever I by means of adjusting-screw $i$ and crank $i^2$ connected therewith, all for the purpose as set forth.

In testimony whereof I have hereunto affixed my signature in the presence of two subscribing witnesses.

CHARLES M. W. SMITH.

Witnesses:
  CHESTER S. NORRIS,
  AMY F. WILLIAMSON.